(12) United States Patent
Vehmaan-Kreula

(10) Patent No.: US 9,643,885 B2
(45) Date of Patent: May 9, 2017

(54) METHOD AND ARRANGEMENT FOR BURNING LIME MUD

(75) Inventor: Juhani Vehmaan-Kreula, Espoo (FI)

(73) Assignee: Andritz Oy, Helsinki (FI)

(*) Notice: Subject to any disclaimer, the term of this patent is extended or adjusted under 35 U.S.C. 154(b) by 694 days.

(21) Appl. No.: 14/001,466

(22) PCT Filed: Feb. 23, 2012

(86) PCT No.: PCT/FI2012/050186
§ 371 (c)(1),
(2), (4) Date: Nov. 1, 2013

(87) PCT Pub. No.: WO2012/117159
PCT Pub. Date: Sep. 7, 2012

(65) Prior Publication Data
US 2014/0044621 A1    Feb. 13, 2014

(30) Foreign Application Priority Data

Feb. 28, 2011  (FI) .................................. 20115198

(51) Int. Cl.
*C04B 2/00* (2006.01)
*C04B 2/10* (2006.01)
(Continued)

(52) U.S. Cl.
CPC ............... *C04B 2/005* (2013.01); *C04B 2/10* (2013.01); *C04B 2/108* (2013.01); *C10J 3/56* (2013.01);
(Continued)

(58) Field of Classification Search
CPC . C04B 2/108; C04B 2/005; C04B 2/10; F27B 7/36; F27B 7/30; C10J 3/54; C10J 3/56; C10J 3/46
(Continued)

(56) References Cited

U.S. PATENT DOCUMENTS 4,745,869 A * 5/1988 Dilmore .................. B01J 6/002
110/208
6,626,662 B2    9/2003 Ramesohl et al.
(Continued)

FOREIGN PATENT DOCUMENTS

EP    1 334 954    8/2003
EP    2 133 402    12/2009

OTHER PUBLICATIONS

International Search Report cited in PCT/FI2012/050186 and mailed Jun. 14, 2012.

*Primary Examiner* — Steven Bos
(74) *Attorney, Agent, or Firm* — Nixon & Vanderhye P.C.

(57) ABSTRACT

The present invention relates to a method and an arrangement for burning lime mud into lime in a lime kiln. The lime mud flows counter-currently to flue gases from a feed end to a firing end and the fuel used is flue gas that is produced by gasifying a fuel in the presence of combustion air in a gasifier. The combustion air for gasification is preheated with heat generated in lime mud combustion. The arrangement is provided with a conduit between the lime kiln and the gasifier for leading air from the lime kiln into the gasifier as combustion air. At least a portion of the combustion air for gasification is preheated with heat generated in the lime mud combustion so that air is led into cooling of lime obtained in the combustion and further into the kiln, from or through the firing end of which air is taken into the gasification.

9 Claims, 3 Drawing Sheets

(51) Int. Cl.
    *C10J 3/56*       (2006.01)
    *F27B 7/20*       (2006.01)
    *F27D 17/00*     (2006.01)
    *F27B 7/36*       (2006.01)

(52) U.S. Cl.
    CPC ................ *F27B 7/20* (2013.01); *F27B 7/36* (2013.01); *F27D 17/004* (2013.01); *C10J 2300/0956* (2013.01); *C10J 2300/1606* (2013.01); *C10J 2300/1869* (2013.01); *Y02P 20/129* (2015.11)

(58) Field of Classification Search
    USPC .................................. 423/175, 177; 432/105
    See application file for complete search history.

(56) References Cited

U.S. PATENT DOCUMENTS

2003/0143508 A1*  7/2003  Ramesohl ............ C04B 7/4446
                                                        432/58
2009/0047613 A1*  2/2009  Demler .................. C04B 2/005
                                                        432/17

* cited by examiner

METHOD AND ARRANGEMENT FOR BURNING LIME MUD

RELATED APPLICATIONS

This application is the U.S. national phase of International Application No. PCT/FI2012/050186 filed 23 Feb. 2012 which designated the U.S. and claims priority to FI 20115198 filed 28 Feb. 2011, the entire contents of each of which are hereby incorporated by reference.

BACKGROUND

The present invention relates to a method and an arrangement for burning lime mud into lime in a lime kiln wherein the lime mud flows counter currently in relation to flue gases from a feed end into a firing end and wherein fuel gas is used as fuel, which gas is produced by means of gasification of a fuel in the presence of combustion air in a gasifier.

Typically, the lime mud formed in a recovery process of the chemical pulp industry is burned into lime (calcium oxide) and carbon dioxide in a rotary kiln. Other lime burning methods exist, but the quality of the lime produced and the combustion costs have not been proved as advantageous as those of lime produced in a rotary kiln.

The lime mud, i.e. calcium carbonate, fed into a rotary kiln is preheated with thermal energy of the flue gases in the kiln. Due to tilting and rotary motion of the kiln, the preheated lime mud flows into a combustion i.e. reaction zone located in the lower part of the kiln, where the calcination reaction required for the production of lime takes place. The last zone is a cooling zone where the lime is cooled prior to discharging it from the kiln.

The surface temperature of the lime in this so-called combustion zone is typically 1000-1200° C. The calcination reaction is strongly endothermal. For maintaining the temperature and for proceeding with the reaction, introduction of energy into the combustion zone is required. Combustion of lime mud into lime (calcium oxide) requires energy in the amount of usually 5500-500 MJ/t. For the production of thermal energy the kiln is provided with a burner, wherein fuel is combusted in the combustion zone. The temperature of the burner's flame is to clearly exceed the temperature of the lime in order to ensure that the energy required for the calcination reaction is transferred to the surface of the lime and therefrom into the core of the lime pellet, providing a satisfactory reaction result.

Sources of heat used in lime kilns comprise liquid, gaseous and solid fuels, such as oil, natural gas and carbon dust (coke). The burner is attached to a firing end in the hot end of the kiln.

The heat contained in the product produced in the lime kiln is recovered by means of transferring it into combustion air required in the burning of the fuel used in the process. Thereby this air (so-called secondary air) is usually led into the kiln bypassing the burner and only so-called primary air is led through the burner, which primary air is required for ignition, stabilization and formation of the flame. The portion of primary air varies depending on the burner and application in question, but most often it is 10-40% of the total amount of combustion air. The primary air is led into the burner via a dedicated fan.

The burnt lime coming from the rotary kiln is typically cooled in satellite or sector coolers rotating together with the kiln. More rarely the cooling takes place in a separate cooling drum or another separate cooling device. Lime mud combustion is characterized by high consumption of energy and thus high combustion air requirement. Thus, the cooling of the lime to an adequately low temperature can be effected only by means of the secondary air in the kiln.

U.S. Pat. No. 4,745,869 discloses a method, by means of which coal is used as fuel. A problem in the use of coal is that molten slag generated in the combustion adheres in the interior of the lime kiln and forms rings that may clog the flow in the kiln. According to the patent, this can be avoided so that a two-stage coal combustion chamber is connected to the kiln, from the first stage of which chamber the molten slag can be removed. The fuel gas generated in the first stage is combusted in the latter stage of the chamber. Combustion air required in the coal combustion chamber can be preheated with flue gases from the lime kiln in an indirect heat exchanger or with hot lime product of the kiln in a direct heat exchanger.

With high-energy fuels, such as oil, natural gas or high-quality coal, an adequately high temperature of the burner flame is easily reached. With wood gas or most of other gases produced by gasifying biomass in a gasifier this so-called adiabatic flame temperature instead remains below the desired value. This results e.g. in increase in the specific heat consumption in lime combustion, since it is not possible to utilize the energy content of the fuel to an adequately large extent for promoting the calcination reaction. The energy shortfall is corrected by burning more fuel, and as a result of that the feed end of the kiln is heated. Then it is not possible to utilize all the heat of the flue gas in lime mud preheating, but an increased portion of the heat escapes the process due to the increased temperature of the flue gas. When the adiabatic temperature of the flame remains low, the nominal production of the kiln can in an extreme case be unreached, since calcination does not proceed far enough with full-scale production. Further, increased flue gas amount can limit the production of the kiln when the auxiliary devices, such as a flue gas fan remain too small.

The product gas of gasification has been used as energy source for lime kilns since the end the 1980-es, but due to the low price of oil and mineral coal it has not gained high popularity. The increased prices of these fuels during the last few years have again made the product gas of gasification a fuel to be reckoned with. Wood bark and sawdust waste that are suitable fuels for a gasifier are readily available at chemical pulp mills.

Wood bark and corresponding biomass can be dried to typically 85% dry solids content, and the dried matter is gasified in e.g. circulating fluidized bed gasifiers at a temperature of typically 750-850 Celsius to product gas that contains as burning components carbon monoxide, hydrogen and hydrocarbons. Gas contains combustion products, such as carbon dioxide and water vapor, and also the moisture of the original dried biomass. Therefore the energy content of wood gas is not as high as that of typical main fuels: oil and natural gas.

In a gasifier, the air temperature required for burning is typically 20-400° C. Preferably it is preheated to approximately 300° C. or higher for minimizing the amount of gasification air. Thus, a higher heat value of the produced gas is achieved, as well as a higher combustion temperature in the lime kiln. By using preheated air, the carbon conversion of the gasifier, and thus the total efficiency is improved.

In the existing lime kilns using wood gas as fuel, cold air is used as combustion air in the gasifier, which air is preheated by means of the product gas from the gasifier, as presented e.g. by E. Kiiskilä ("Pyroflow gasifier replaces oil in lime kilns" in publication "Biomassan uusia jalostusmandollisuuksia 1990-luvulla" (New refining possibilities for biomass on 1990s); [VTT Symposium], 1987, Espoo, F I, Vol 75, pages: 76-89, and European patent application 2133402, whereby the temperature of the product gas is decreased. This temperature decrease directly reduces the temperature of the flame burning in the kiln, which is of importance. Alternatively the combustion air can be heated with steam exchangers, but also then valuable energy is to be consumed.

Compared to oil or natural gas lime kilns, the secondary air requirement of said lime kilns using gasification gas is smaller, since a portion of the fuel burning has already taken place in the gasifier. Thus, also the amount of air flowing through the lime cooler is smaller and the lime remains hotter, which means that the amount of thermal energy recovered therefrom back to the process therefrom is smaller than in oil or natural gas kilns. When using fuel gas of the gasifier, the fuel in the lime kiln already contains more oxygen, whereby its combustion air requirement is smaller anyway.

SUMMARY OF INVENTION

A method and system have been invented to improve the energy economy of a gasifier/lime kiln arrangement. Especially the method and system more efficiently utilizes the thermal energy being released in the lime kiln, when the fuel used in the lime kiln is fuel gas produced in a separate gasifier.

The present invention relates to a method of burning lime mud into lime in a lime kiln, wherein the lime mud flows counter-currently against flue gases from the feed end to the firing end and wherein the fuel is fuel gas produced by gasifying fuel in the presence of combustion air in a gasifier. The method is characterized in that at least a portion of the combustion air of the gasification is preheated by means of heat generated in lime mud combustion so that air is led to cooling of the lime obtained in the combustion and further into the kiln, from or through the firing end of which air is taken into gasification.

As described in the above, lime kilns are provided with a lime cooler for recovering heat. Separate cooling drums are also used, but generally the cooler is attached to the actual kiln. The cooler is located at the firing end of the kiln, from where burnt lime exits into the cooler. The lime is cooled by counter-currently flowing air. The cooling of lime with this secondary air recovers heat from the hot lime. This air then flows into the kiln where it is used as combustion air for the lime kiln burner. According to the present invention, this hot secondary air is additionally used as combustion air for the gasifier.

According to an embodiment of the invention, a conduit is arranged between the gasifier and the firing end of the lime kiln, via which conduit secondary air from the lime kiln is led into the gasifier. The conduit is provided with a fan or corresponding for withdrawing air from the kiln. The conduit extends through the firing end to a suitable distance to the interior of the kiln. According to a preferred embodiment the combustion air for the gasifier is withdrawn from the depth of the so-called kiln dam or from almost the level of the burner inside the kiln. As known, for improving heat transfer the breast is mounted at the hot end of the kiln proximate to the lime discharge zone. The dam is formed by tapering the diameter of the kiln housing or by thickening the refractory lining of the kiln.

The cooler is surrounded by a stationary cylindrical radiation shield that is insulated from the outer side and at one end tightly connected to a cooled lime discharge hopper, through which the lime exits the kiln. The function of the radiation shield is to act as thermal insulation outwards and to prevent dust leakages. One end of the radiation shield is partly open, and the cooling air is withdrawn into the cooler through a gap between that end and the burner end of the kiln. Most of the cooling air is led through a canal between the kiln housing and the inner casing of the cooler into the interior of the cooler to a sector portion, where cooling of the lime takes place according to the counter-current principle. A smaller portion of the air is guided through the gap between the radiation shield and the cooler into the canal between them. From this canal the air heated by the hot lime can be led as combustion air into the gasifier. This is one embodiment for obtaining combustion air for gasification through the housing of the lime kiln. Thereby a temperature of approximately 200° C. is obtainable.

According to an embodiment the combustion air for gasification is taken through the housing of the lime kiln at a point located at a distance from the firing end and downstream of the lime cooler in the direction of the longitudinal axis of the kiln. For implementing this, an additional housing part is mounted around the kiln. It can be formed of a cylindrical piece concentric with the kiln, which piece in the circumferential direction surrounds the kiln totally or partially and which has a desired length in the longitudinal direction of the kiln. The length may be e.g. 10 meters. Air is taken between the cylinder and the kiln housing, whereby heat radiating from the kiln has heated the air. This is another embodiment for taking combustion air for gasification through the lime kiln housing. This embodiment requires more additional equipment, and a temperature of over 200° C. is typically not achieved, since the temperature of the kiln casing in well insulated kilns is typically 200-250° C.

According to an embodiment of the invention the combustion air for gasification is heated with heat from the lime kiln flue gas. Thereby the flue gas from the lime kiln and air are led into an indirect heat exchanger, wherein the air is heated by the heat of the flue gas and wherefrom the heated air is led into the gasifier as combustion air. This embodiment requires more additional equipment, and a temperature of over 200° C. is typically not achieved. From flue gas the heat may be recovered also into another medium, such as water or steam, by means of which the air is heated indirectly.

In the firing end of the kiln the temperature of secondary air prior to the flame is typically over 300° C. Thus, the combustion air for the gasifier does not need to be heated with "primary energy", such as heat of the fuel gas for the gasifier, but a more economical heat source can be used. An additional benefit obtained when using heated secondary air is more efficient lime cooling, whereby a greater portion of energy is recovered from the energy exiting entrained in the lime. As described in the above, said heat source can be also some other waste heat from the lime kiln.

According to one calculation, the heat consumption of a lime kiln could decrease by 2% if the combustion air for the gasifier was obtained from the firing end of the lime kiln instead of product gas of the gasifier. A still greater saving would be obtained by preheating the gasification air by means of some other heat source, e.g. waste heat of the lime kiln housing or flue gas. The assumption in the calculation was that the air amount required for the gasification is 20% of the total combustion air amount of the lime kiln. Further, it has been assumed that for calcination of lime could be utilized the portion of the fuel energy that in combustion heats the flue gases to a temperature over 1200° C. The calcination reaction starts at a temperature considerably below that, at approximately 800° C. Practical experience of burning lime mud in a rotary kiln has, however, shown that an adequate temperature difference to the lowest possible calcination temperature is required in order to achieve material and heat transfer of adequate extent for the reaction.

The exemplary calculation shows that fuel having a lower caloric value of approximately 15 MJ/kg can produce 6.7 MJ/kg of heat having a temperature higher than 1200° C., which in accordance with what was stated in the above is the heat that does the calcination operation. The rest of the caloric value of the fuel can participate in drying and heating the lime mud. The amount of this heat in a modern lime kiln process is in most cases excessive, which is shown in that the flue gas temperature in the kiln is high, even over 300° C. and often periodical water-cooling of the flue gas is required.

If, in accordance with prior art, the heat for the combustion air of the gasifier is obtained from fuel gas, the adiabatic temperature of the flame in the lime kiln burner is directly lowered and thereby the portion of the heat having a temperature higher than 1200° C. is decreased.

By taking the combustion air for the gasifier from the firing end of the lime kiln, hot air is taken for the gasification without lowering the fuel gas temperature. On the other hand, by doing this, the secondary air temperature in the lime kiln decreases, but the decrease in the adiabatic temperature of the flame is not as extensive as when taking the required heat from fuel gas for preheating the combustion air for gasification.

By taking the combustion air for the gasifier through a cooler, the operation of the cooler is intensified and the temperature of the lime exiting therefrom is decreased. That is, a greater portion of the heat of the exiting lime is recovered in combustion air.

Intensified cooling is an advantage as such, which assists in further treatment of the lime and protects the cooler against damages and blockages caused by high temperature. Additionally, the cooling air for the lime can be withdrawn along the kiln housing, whereby a function of the air is also to cool the kiln housing. By withdrawing more air, also the cooling of the housing is intensified.

According to an embodiment of the invention, air taken from the interior of the lime kiln is mixed with another preheated air and/or ambient air for regulating the temperature of the combustion air for gasification. According to an embodiment, air taken from the interior of the lime kiln is mixed with air taken from between the cooler and the radiation shield surrounding it and/or ambient air for regulating the temperature. Then the air ducts are provided with suitable regulation devices, such as a flap valve, for obtaining a suitable air mixture for the desired temperature of combustion air.

However, implementing the present invention is not limited to a certain kind of gasifier, which is separate from the lime kiln, but it is especially advantageously applicable when the gasification takes place according to the fixed bed or fluidized bed principle (such as circulating bed or bubbling fluidized bed gasification). The present invention is especially applicable for heating the combustion air required by gasification of biomass-based fuels. This kind of fuels comprise e.g. wood-based fuels, such as wood, wood chips, bark chips, hogged wood, planer shavings, saw dust, wood-based forest residues and other fuels having a low caloric value.

SUMMARY OF DRAWINGS

The present invention is described in more detail by means of embodiments according to the invention and with reference to the appended figures, in which.

DETAILED DESCRIPTION OF INVENTION

Figure 1:
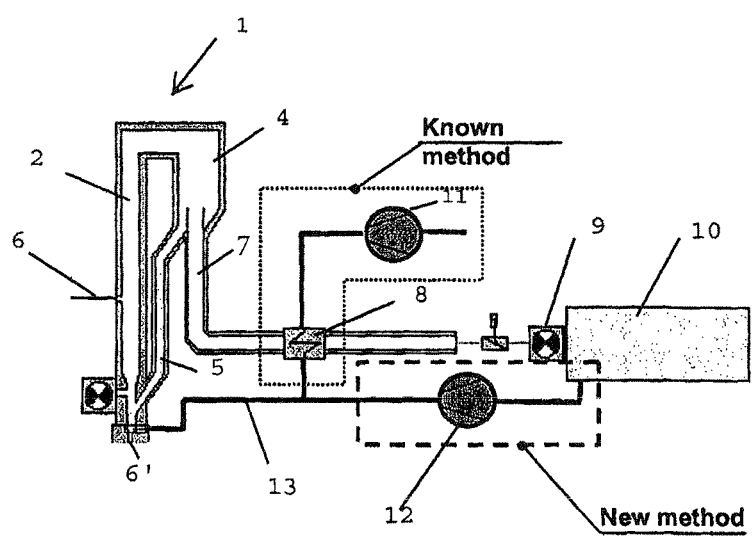
FIG. 1 illustrates schematically a prior art and an inventive arrangement of a gasifier and a lime kiln.

FIG. 1 illustrates components of a lime mud combustion plant and a gasifier that are needed for describing the invention. The gasification unit is in this case a circulating fluidized bed gasifier 1, i.e. a CFB-gasifier. It comprises a gasification reactor 2, a grate 3, a cyclone 4 and a cyclone return pipe 5. A fluidized bed is arranged at the lower part of the gasifier, above which bed a fuel is introduced. The fuel is typically solid bio-based fuel 6, such as bark, wood chips etc. Ash generated in the gasification is removed via conduit 6'.

The hot product gas exits the gasifier via duct 7 and is partially cooled in an air preheater 8. Then the product gas is led into a burner 9 of the lime kiln 10 via the gas duct 7.

In this known arrangement, the combustion air for the gasifier is introduced by means of a fan 11 from ambient conditions. Prior to feeding into the gasifier, the air is, heated typically to 300-400° C. by cooling hot product gas from the gasifier in the heat exchanger 8. The heat exchanger is typically a twin-housing heat exchanger located at the initial end of the gas duct downstream of the cyclone. Hot product gas flows in the inner tube of the heat exchanger and air flows to the same direction in a dedicated channel around the inner tube. This kind of exchanger is space-consuming.

According to the embodiments of the present invention, air is introduced by means of a fan 12 from the firing end of the lime kiln 10 into the gasifier via air duct 13.

An advantage of the present invention is that it is simple as an apparatus solution, since it utilizes a lime cooler required as such in any case. Only the air duct from the firing end of the lime kiln into the gasifier is to be constructed, and no separate air preheater is needed, which would be considerably more space-consuming and more expensive. Further, a heat exchanger is susceptible to erosion caused by ash entrained in gas.

Figure 2:
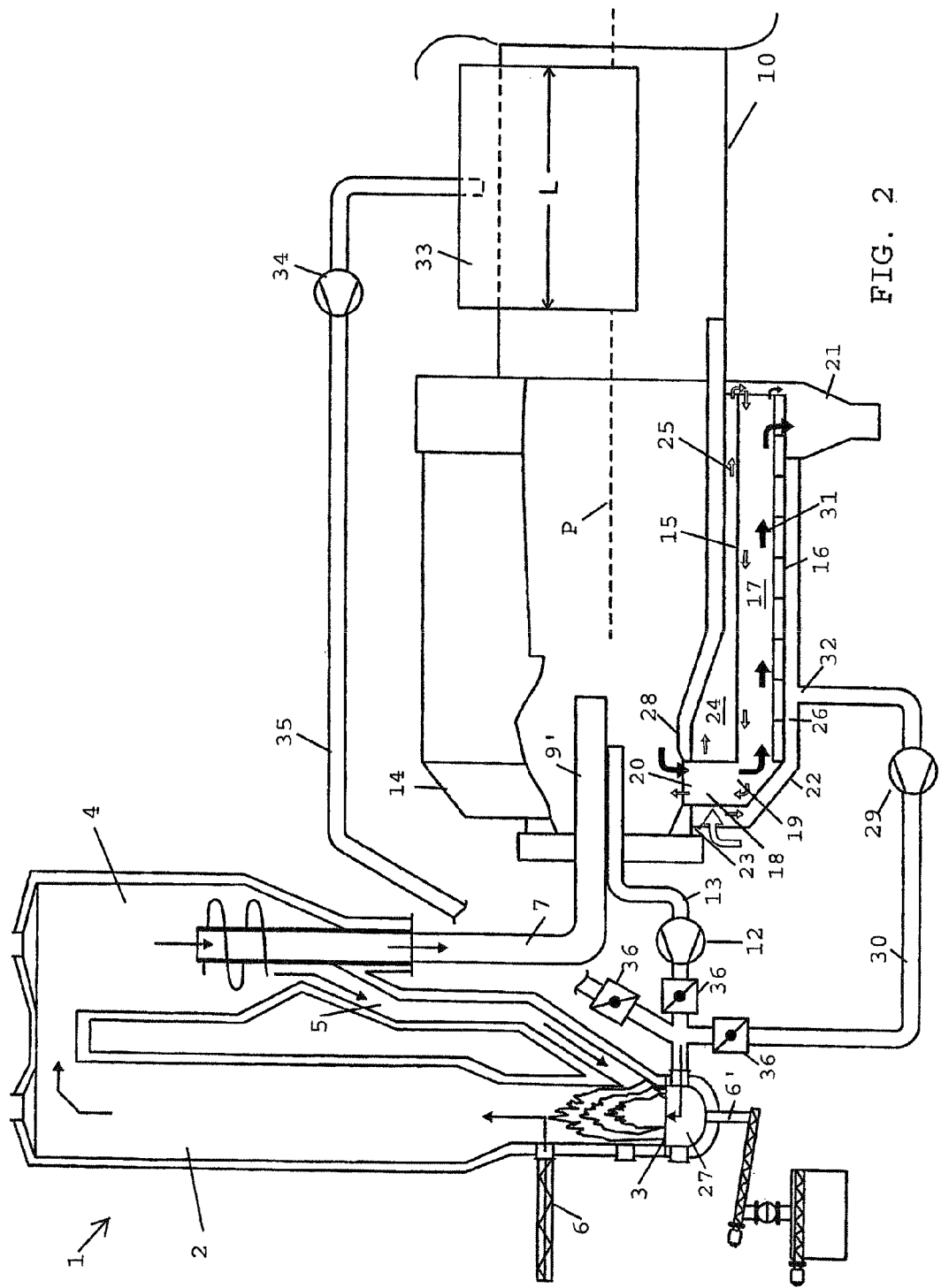
FIG. 2 illustrates an arrangement for implementing some embodiments according to the invention.

FIG. 2 illustrates in more detail the leading of the gasifier combustion air out of the lime kiln 10, which is a rotary drum kiln. The cooler 14 of the lime kiln comprises two cylindrical housings 15 and 16, disposed one inside the other, surrounding the kiln and rotating together with the kiln, which housings are mounted at the discharge end of the kiln concentrically with the kiln. An annular space 17 is formed between them. The inner cylindrical housing 15 is attached at its initial end to the kiln via drop chutes 18. Via the drop chutes, an inlet 19 of the annular space 17 of the cooler communicates with the discharge opening 20 of the kiln for leading the hot material from the kiln into the cooler. A plurality of drop chutes 18 are provided around the circumference of the kiln. Transportation of the material being cooled inside the cooler is accomplished by means of feed devices known per se, such as feed vanes (not shown) that can be located on any wall of the cooler space. The transportation can also be accomplished by means of separate members constructed inside the cooler space. The cooled material is discharged from the cooler 14 into a discharge hopper 21. The flow of lime is shown with black arrows 31.

The cooler 14 of the lime kiln is surrounded by a stationary cylindrical radiation shield 22 that is insulated from the outside and tightly connected to the discharge hopper 21. The function of the radiation shield is to act as thermal insulation outwards and to prevent dust leakages. Its end facing the discharge hopper 21 is partly open. The cooling air is withdrawn into the cooler through a gap 23 between this partly open end and the firing end of the kiln. Most of the cooling air is directed from a canal 24 between the kiln housing and the inner housing 15 of the cooler via the discharge hopper 21 into the cooler to a sector part, where cooling of the lime takes place according to the counter-current principle. The flow of the air is shown with white arrows 25. A smaller portion of the airs is directed through the slot between the radiation shield and the cooler duct 26 between them.

The flow of air in the canal 24 prevents excess heating of the kiln housing. From the cooler, preheated air flows further via drop chutes 18 into the kiln 10 as secondary combustion air. In accordance with an embodiment of the invention, a duct 13 is mounted in the firing end of the lime kiln, which duct is provided with a fan 12 for leading secondary air as combustion air into the gasifier. The air is led into a wind box 27 of the gasifier below the grate 3. The air duct can extend into the kiln to a desired depth; preferably it extends to a so-called dam 28 of the kiln. The choice of the depth is dependent on optimizing between the dust-content of the air, the temperature and strength of the materials and air temperature.

Product gas is led from the gasifier along channel 7 into the gasifier 9' of the gasifier for combustion fuel.

According to an embodiment, air can be obtained from the kiln also from canal 26 20 between the radiation shield and the cooler. Then a duct 30 provided with a fan 29 is arranged in an opening 32 in the outer wall of the canal, which duct leads the air heated. by lime into the gasifier 1 as combustion air. In FIG. 2, the air duct 30 is connected to the lower part of the kiln, but it is more advantageous to withdraw air through the upper part of the kiln cooler.

According to an embodiment, the combustion air for gasification is taken through the housing of the lime kiln at a point located at a distance from the firing end and downstream of the lime cooler in the direction of the longitudinal axis, P, of the kiln. For accomplishing this, an additional part of the housing, a hood 33, is mounted around the kiln. The hood can be formed of a cylindrical piece concentric with the kiln, which piece in the circumferential direction surrounds the whole kiln or a portion thereof and which in the longitudinal direction of the kiln has a desired length L. Air is taken between the cylinder and the kiln housing, whereby the air has been heated by heat radiating from the kiln. Air is withdrawn from between the cylindrical piece 33 and the kiln by means of a fan 34 and led via duct 35 to be used as combustion air for the gasifier.

The air ducts 13, 30 and 35 are provided with valves 36, such as flap valves, for regulating the air amount. This allows also regulating the use of different air streams in a desired proportion, if other air sources 30 and 35 are used in addition to air 13 taken from the firing end of the kiln.

Figure 3:
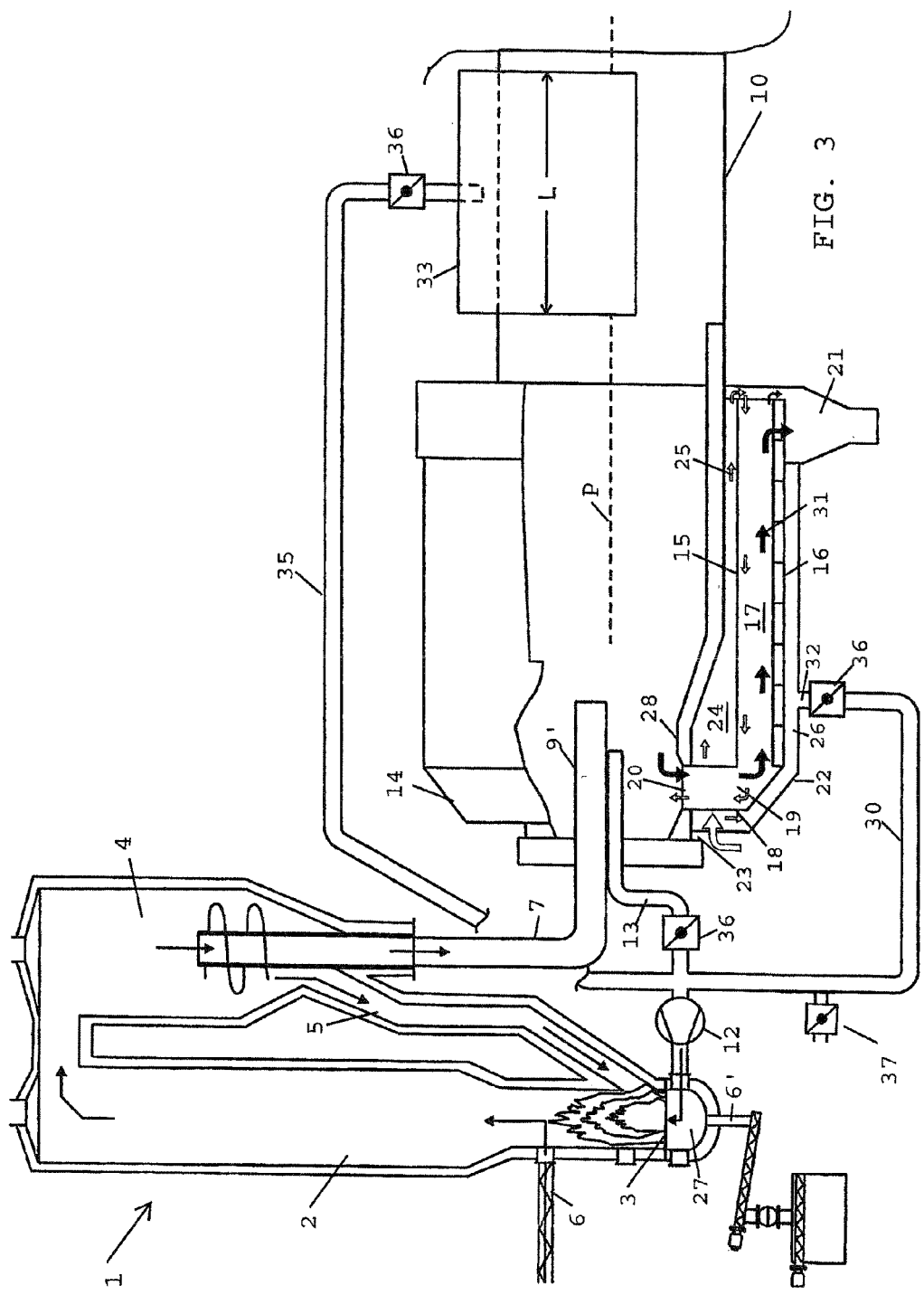
FIG. 3 illustrates an arrangement for implementing some of the embodiments of the invention.

FIG. 3 illustrates another embodiment for arranging the air ducts. In this case other air streams 30 and 35 (air from canal 26 between the radiation shield and the cooler and/or air from between the hood 33 and the kiln housing) are led into duct 13 for the air stream taken from the firing end of the lime kiln upstream of the fan 12. Additionally, for further regulation of the gasification air temperature, air of lower temperature can be introduced from the surroundings of the kiln via conduit 37. In this embodiment, each air duct is provided with a regulation valve 36, but the fan 12 is common.

As presented in the above, a lime kiln has several locations where air heated by the heat of the lime mud combustion process can be taken and led into the gasifier as combustion air. In the simplest case, only a pipeline provided with a fan or corresponding needs to be arranged between the lime kiln and the gasifier.

Though the above description relates to an embodiment of the invention that is at the light of present knowledge the most preferred, it is obvious for one skilled in the art that the invention can be modified in several different ways within the broadest possible scope defined by the appended claims only.

The invention claimed is:

1. A method for burning lime mud in a rotary drum kiln comprising:
  moving lime mud through the rotary drum kiln while flue gas flows through the kiln counter-currently to the lime mud;
  producing lime from the lime mud in the rotary drum kiln and discharging the lime from the rotary drum kiln;
  forming the flue gas with a burner positioned proximate to an end of the rotary drum kiln;
  fueling the burner with a fuel gas;
  producing the fuel gas by gasifying fuel in the presence of combustion air in a gasifier including a solid bed or fluidized bed, wherein the gasifier is physically separate from the rotary drum kiln and burner;
  heating air for use as the combustion air with heat from the lime discharged from the rotary drum kiln.

2. The method according to claim 1, wherein the air is heated with heat recovered by cooling the lime or a housing of the rotary drum kiln.

3. The method according to claim 1, further comprising obtaining additional combustion air for gasification from an interior of the rotary drum kiln upstream in the direction of lime mud flow from a dam in the rotary drum kiln.

4. The method according to claim 2, further comprising cooling the lime mud or the housing in a lime cooler section of the rotary drum kiln by ducting the air through the lime cooler before the air is used as the combustion air.

5. The method according to claim 1, wherein the heating of the air for the combustion air includes cooling a housing of a cooler section of the rotary drum kiln.

6. The method according to claim 5, wherein the heating of the air includes passing the air between a radiation shield surrounding the cooler section and the cooler section.

7. The method according to claim 1, wherein the fuel to be gasified includes at least one of a bio-based material, a wood-based material or a biomass material.

8. A method to convert lime mud to lime in a rotary drum kiln comprising:
  moving lime mud through the rotary drum kiln while flue gas flows through the kiln counter-currently to the movement of the lime mud;
  producing lime from the lime mud in the rotary drum kiln and discharging the lime from the rotary drum kiln;
  combusting a fuel gas in a burner to produce the flue gas, wherein the flue gas flows through the rotary drum kiln counter-currently to the movement of the lime mud;
  producing the fuel gas by gasifying fuel in a gasifier including a solid bed or fluidized bed, wherein the gasifier is physically separate from the rotary drum kiln and burner;

heating air for use as the combustion air in the gasifier with heat from the lime discharged from the rotary drum kiln.

9. The method of claim 8 further comprising cooling the lime with the air.

\* \* \* \* \*